(No Model.)

L. CONNOR.
CORN HOE.

No. 274,108. Patented Mar. 20, 1883.

WITNESSES
F. U. Adams
F. W. Kasehagen

INVENTOR
Lawrence Connor
per W. E. Dayton
Attorney.

UNITED STATES PATENT OFFICE.

LAURENCE CONNOR, OF FOX LAKE, WISCONSIN.

CORN-HOE.

SPECIFICATION forming part of Letters Patent No. 274,108, dated March 20, 1883.

Application filed June 1, 1882. (No model.)

*To all whom it may concern:*

Be it known that I, LAURENCE CONNOR, of Fox Lake, in the county of Dodge and State of Wisconsin, have invented certain new and useful Improvements in Corn-Hoes; and I do hereby declare that the following is a full, clear, and exact description thereof, reference being had to the accompanying drawings, and to the letters of reference marked thereon, which form a part of this specification.

This invention relates to improvements in corn-hoes or hand-cultivators, and has for its object to provide a construction by which the earth about the corn may be thoroughly and quickly loosened and stirred by a less number of movements and with less exertion by the operator than are required by the common forms of hoe.

The invention consists essentially in a handle having at one end a T-head, by which it is held and rotated, and at the other two centrally-separated groups of teeth duly supported, having the same general direction as the handle, and intended to be thrust vertically into the ground about the corn and revolved, said handle being provided with means for retaining the center of motion while the teeth are being revolved.

It consists, further, in devices for regulating the depth to which the teeth may penetrate the earth, and in certain other features of construction, as will hereinafter fully appear.

Figure 1:
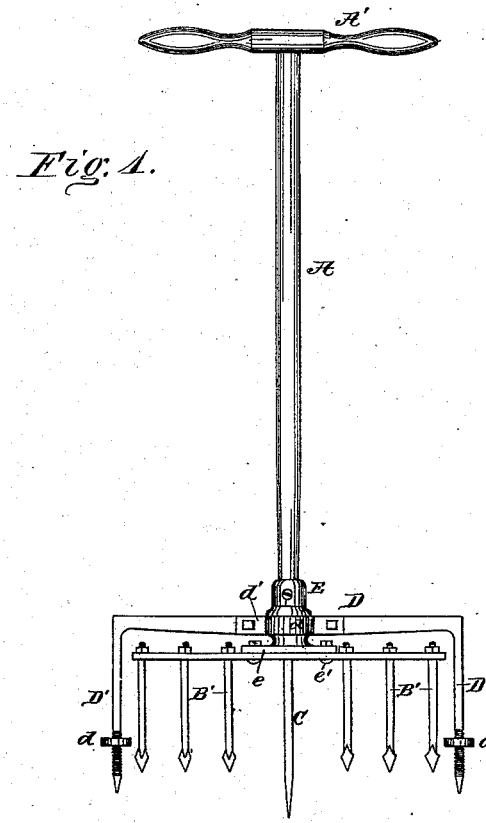
Figure 2:
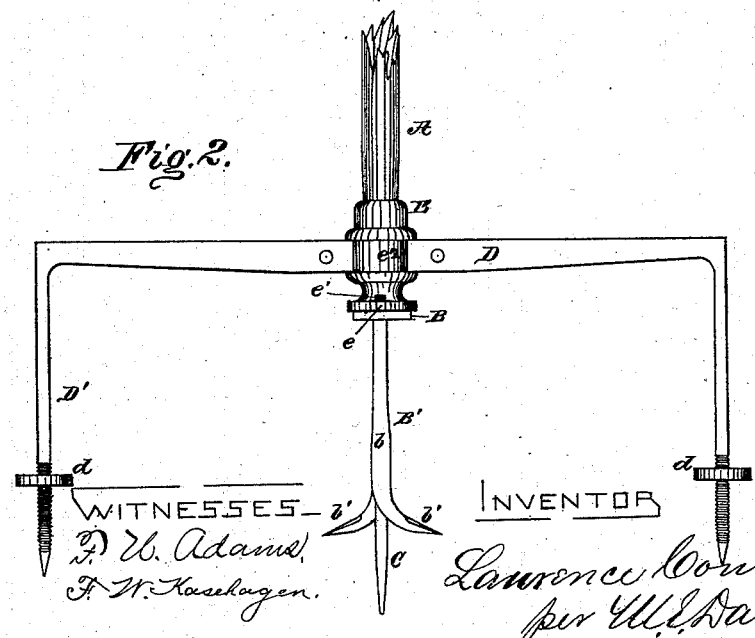

In the drawings, Figure 1 is an elevation of the broad side of my improved hoe. Fig. 2 is an enlarged view of the hoe, rotated a quarter-turn from the position shown in Fig. 1, or with the hoe-teeth brought into line with the eye.

A is a handle—say two and a half feet long, or thereabout—having at its upper end a fixed head, A', by which the hoe is carried and operated, and having at its lower end the horizontal teeth-head B, from which depend the teeth B'.

As shown in the drawings, and for reasons which will hereinafter appear, the teeth B' are disposed along the outer portion of each half of the head B, so as to leave a central space beneath the handle A without teeth. Said teeth may be made in a variety of forms, and may also vary in number. They may be arranged to depend in a strictly vertical direction, or set obliquely, or may be curved. In the drawings I show a preferred construction, wherein each tooth consists of a long shank, *b*, widened below into a small blade or shovel, *b'*, and said shovel *b'* and the lower end of said shank *b* are curved laterally at right angles with the head B; but, for reasons to be presently shown, all the teeth in one group are thus curved to one side, and all in the other group to the other side of said head B.

C is a slender central spike set into the lower end of the handle A, or secured to the head B axially in line with said handle, and extending downward a distance below the ends of the teeth B', as shown.

D is a cross-head applied to the handle A, just above the head B, in such manner as to rotate on said handle, and longer than the head B. At its ends said head D is provided with the downwardly-projecting arms D', extending a short distance below the line of the hoe-teeth B'. The arms D' are provided with the flanges *d*, which are preferably vertically adjustable on the arms by being screw-threaded thereon, as shown.

In operation the tool is carried from hill to hill by the T-head A', and preparatory to hoeing a hill of corn it is thrust downward or let fall with the spike C standing vertical in the center of the hill. The flanges *d* serve as guides or gages to regulate the depth at which the teeth should penetrate the ground. After being thus thrust into the hill the T-head A' is rotated by the hands—say a half-revolution and back to its original position—carrying the teeth B' circularly about the spike C and around the plants. The direction of the first or forward rotation is such as to give the teeth B' a plow action if of the curved or plow shape shown. In this rotation of the handle and teeth the arms D D' remain stationary and obviously assist in holding the tool in a vertical position. They also co-operate with the central spike, C, to preserve the center of rotary motion. For the latter purpose, either the said spike or the arms D' are alone sufficient; but I prefer to use both, for the combined purposes set forth.

As a suitable device for properly connecting the several parts at the lower end of the handle A, the casting E is provided, said casting having a socket in its upper end for the reception of the handle A, two lateral flanges at its lower end for the attachment of the head B by bolts e e, and a central groove, e', in which the bar D, bent at its middle to fit half around the same, is held by the similarly bent plate d'. (Shown in Fig. 1 and absent in Fig. 2.)

It is manifest that a vertical shaft corresponding with the handle A may have a plow or set of teeth B' projecting on one side only of its axis, which tooth or teeth may be revolved entirely around the hill by a simple gearing, similar to that of a class of egg-beaters, or of a class of drills well known.

I claim as my invention—

1. In a rotary hand-cultivator, the combination, with the handle A A', intended to be held vertically and rotated in use, of the horizontal cross-bar B, rigidly secured to the handle and provided with a centrally-separated series of teeth, B', which enter the ground at opposite sides of the hill, and one or more spikes which enter the ground and preserve the center of motion of said teeth when the latter are revolved by rotation of the handle, substantially as described.

2. In a rotary hand-cultivator, the combination, with the handle having longitudinally-projecting teeth B', secured thereto and arranged at one or both sides of the axis of the handle, as shown, of the spike C, secured in the end of and in line with the handle and longer than the teeth B', substantially as described, and for the purposes set forth.

3. In combination with the handle having rigidly-attached longitudinally-projecting teeth B' at one or both sides of the handle-axis, as described, the cross-head D, centrally pivoted to the handle, and having the downwardly-projecting arms D', exterior to the teeth and provided with gage-plates d, substantially as described.

In testimony that I claim the foregoing as my invention I affix my signature in presence of two witnesses.

LAURENCE CONNOR.

Witnesses:
L. C. GEBARD,
A. G. DOMINY.